United States Patent [19]

Geidel et al.

[11] Patent Number: 4,887,424
[45] Date of Patent: Dec. 19, 1989

[54] PROPFAN TURBINE ENGINE

[75] Inventors: Helmut Geidel, Karlsfeld; Alois Rohra, Munich, both of Fed. Rep. of Germany

[73] Assignee: Motoren- und Turbinen-Union Munchen GmbH, Munich, Fed. Rep. of Germany

[21] Appl. No.: 191,042

[22] Filed: May 6, 1988

[30] Foreign Application Priority Data

May 6, 1987 [DE] Fed. Rep. of Germany ....... 3714990

[51] Int. Cl.$^4$ .............................................. F02C 7/06
[52] U.S. Cl. .............................. 60/39.08; 416/170 R; 416/174
[58] Field of Search ................. 60/39.08, 39.2, 39.33, 60/226.1; 416/146 A, 170 R, 174; 184/6.11

[56] References Cited

U.S. PATENT DOCUMENTS

| 2,474,143 | 6/1949 | Forsyth | 60/226.1 |
| 2,587,649 | 3/1952 | Pope | 60/39.33 |
| 2,619,797 | 12/1952 | Haworth | 416/170 |
| 3,912,418 | 10/1975 | Andrews et al. | 416/146 A |
| 4,693,672 | 9/1987 | Carvalho | 416/174 |

FOREIGN PATENT DOCUMENTS 2131094 6/1984 United Kingdom ............... 60/39.08

Primary Examiner—Louis J. Casaregola
Attorney, Agent, or Firm—Roberts, Spiecens & Cohen

[57] ABSTRACT

A propfan turbine engine having a reduction gearing for the propfan rotors is provided with a lubricating system of its own for the reduction gearing, the system being arranged axially between the gas turbine and the reduction gearing and formed as an annular assembly surrounding a drive shaft from a gas turbine to the reduction gearing. Cooling air is supplied to the lubricating system as a location which will not interfere with the supply of air to the compressor of the gas turbine.

14 Claims, 2 Drawing Sheets

PROPFAN TURBINE ENGINE

FIELD OF THE INVENTION

The present invention relates to a propfan turbine engine having a gas turbine, a reduction gearing and one or more propfan rotors.

BACKGROUND

Turbine engines which drive output shafts require, in view of the high speed of rotation of the turbine rotor, a reduction gearing to drive the output shaft at a reduced speed of rotation with a large torque. A typical application is a turboprop engine in which a gas turbine drives a propeller via a planetary gearing. Heretofore, for lubrication and abstraction of heat due to friction in the reduction gearing, a lubricating oil circuit therefor has been connected to the lubricating oil system of the gas turbine.

A new direction in the development of aircraft engine construction is represented by the propfan turbine engine in which one or two propfan rotors are connected to the driving gas turbine by a reduction gearing. For such propfan engines, the power transmitted is substantially greater than that of the most powerful turboprop engines.

Because of the amount of heat which is thereby produced in the reduction gearing and the increase in the turbine temperatures, the common lubricating oil system for the gas turbine and the reduction gearing has serious disadvantages. Accordingly, in view of the considerable amount of heat to be removed, a lubricating oil system which is more efficient than the traditional construction is required. A sufficiently dimensioned oil cooler arranged outside the engine requires long oil lines, as a result of which considerable frictional losses occur due to the large flow of lubricant. Furthermore, if the assembly consisting of the propfan rotors and the reduction gearing must be separated from the gas turbine, for example, for repair purposes, the oil lines must be interrupted which makes for substantial difficulty.

SUMMARY OF THE INVENTION

An object of the present invention is to provide a lubricating oil supply for a propfan turbine engine, particularly for the reduction thereof, which provides good removal of heat with low frictional losses, takes up little space and permits simple separation of the gas turbine from the reduction gearing for maintenance or repair.

In accordance with the invention, this object is achieved by providing the reduction gearing with its own lubricating oil system consisting of an oil cooler, an oil pump and an oil tank in the form of an annular assembly arranged axially between the reduction gearing and the gas turbine.

The arrangement in accordance with the invention has the advantage that the lubricating system utilizes the space between the gas turbine and the reduction gearing which is required for aerodynamic reasons. The lubricating system is protected by the reduction gearing lying in front of it so that foreign bodies which might pass through the nose cap of the engine will not cause damage and leakage from the lubrication system with devastating consequences for the engine. Furthermore, the lubricating system is connected by oil lines only to the reduction gearing which lies in front of it and to the bearings of the propfan rotors, while it is completely separate from the gas turbine. The gas turbine has its own lubricating system. In this way, the entire propfan assembly can be separated from the gas turbine at minimum expense, without having to interrupt the oil lines. The oil lines can be kept short so that frictional losses in the lines remain slight.

By forming the oil cooler as an annular body which is arranged radially within the gas turbine intake channel, a short structural length of the lubricating system is achieved. In a preferred embodiment, an annular intake channel for cooling air is provided in front of the gas turbine intake channel, as viewed in the direction of air flow. In this way, a favorable supply of cooling air is obtained without adversely affecting the flow of air to the intake channel of the gas turbine. Preferably, the intake channel for the cooling air of the lubricating system is connected to an annular space which is formed between an intake housing of the gas turbine and the gear housing the reduction gearing, the oil cooler being arranged in said annular space. In this way, the oil cooler is readily accessible for maintenance purposes when the entire propfan assembly is separated from the gas turbine.

In further accordance with the invention, axially behind the annular space there is arranged an annular discharge channel which is in communication, via a number of hollow support ribs, to a vented chamber present between the gas turbine and the engine cowling. In this way, a favorable discharge of the cooling air which has been heated in the oil cooler is possible and the heated cooling air is prevented from entering the gas turbine intake channel and thus adversely affecting its operating parameters. A compact construction of the lubricating system is obtained by integrating the oil tank in the housing of the reduction gearing. The latter is preferably formed with an annular chamber which surrounds the shaft which drives the reduction fearing from the gas turbine. The oil pump is arranged within the oil tank, thus saving space.

In further accordance with the invention, the reduction gearing comprises a planetary gearing and the oil pump is driven by a toothed shaft connected to a planet gear mounted in a stationary housing of the reduction gearing. Thereby, a simple, spacesaving drive of the oil pump is achieved.

BRIEF DESCRIPTION OF THE FIGURES OF THE DRAWING

A preferred embodiment of the invention will be described below with reference to the accompanying drawing, in which.

DETAILED DESCRIPTION OF A PREFERRED EMBODIMENT

Figure 1:
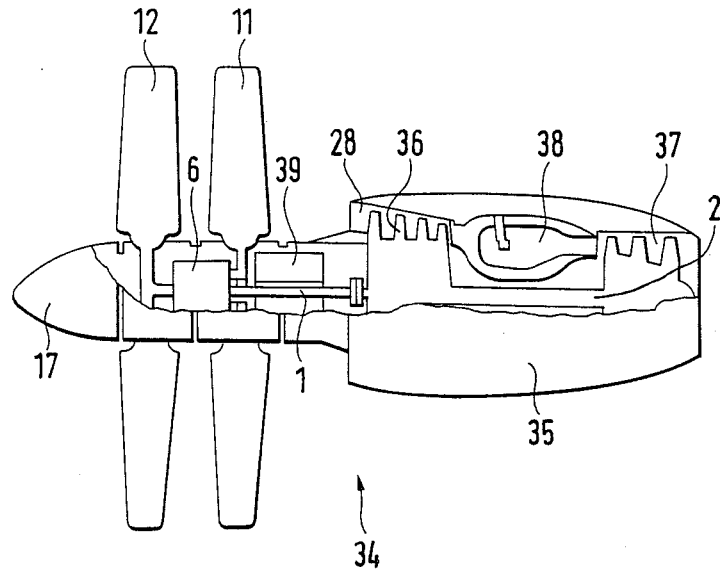
FIG. 1 is a longitudinal view, partly broken away, of a two-stage propfan turbine engine which incorporates the apparatus of the invention.

FIG. 1 shows a propfan turbine engine which consists essentially of a front propfan rotor stage 12, a rear propfan rotor stage 11, and a gas turbine 35. A rotor 2 which is drivingly coupled to a compressor 36 and a turbine 37 of the gas turbine 35 is connected to a drive shaft 1 which, in turn, is connected to a reduction gearing 6. Between compressor 36 and turbine 37 there is arranged a combustion chamber 38. The lubricating system of the invention is provided between reduction gearing 6 and an intake channel 28 of the compressor 36.

Figure 2:
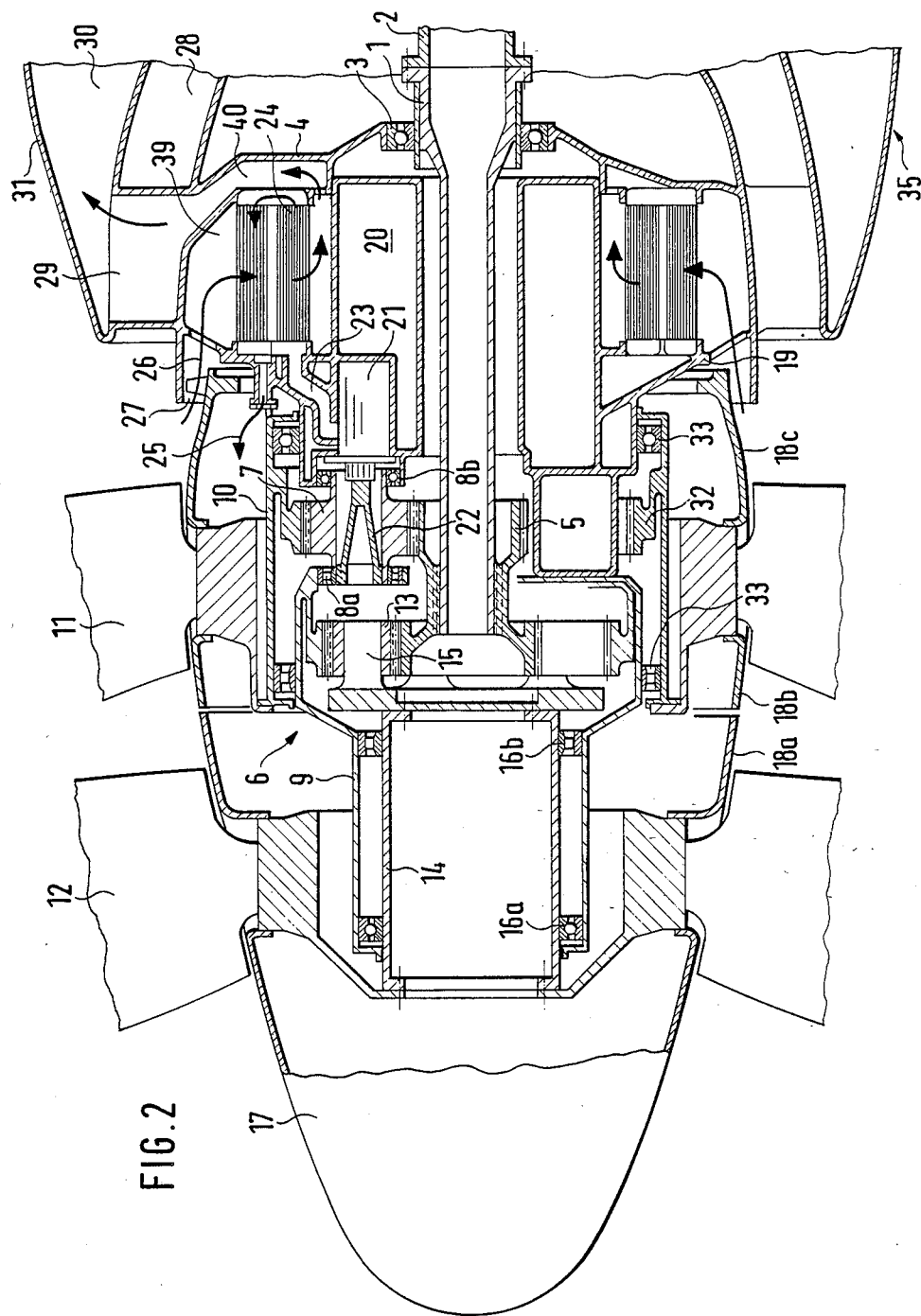
FIG. 2 is a longitudinal sectional view, on enlarged scale, through the front part of the propfan turbine engine.

The drive shaft 1 is formed as a hollow shaft which is mounted, as shown in FIG. 2, at the rotor side by ball bearings 3 in an intake housing 4 of the gas turbine 35 and is connected at the opposite side to a sun wheel 5 of the reduction gearing 6. Planet gears 7 are rotatably mounted by bearings 8a, 8b in a split housing 9 of the gearing 6 and the gears 7 are in mesh with sun gear 5 and an outer hollow gear 32 for transmission of torque from the drive shaft 1 to a sleeve 10 which is secured to the rear propfan stage 11. The torque for the front propfan stage 12 is transmitted by the sun wheel 5 via planet gears 13 to support pins 15 integrated with a plate fixed to a hollow shaft 14 secured to the front stage 12.

The hollow shaft 14 which is connected to the front propfan stage 12 is mounted by bearings 16a, 16b in the gear housing 9. In this connection the two propfan stages 11, 12 have opposite directions of rotation. A nose cap 17 and cowlings 18a, 18b and 18c are fastened to the rotors of the propfan stages 11 and 12.

The gear housing 9 is connected via a flange 19 to the intake housing 4. An oil tank 20 is formed as an annular chamber and is integrated in the gearing housing 9. An oil pump 21 is connected to the oil tank 20 and incorporated along its entire length within the oil tank 20. The oil pump 21 is driven by a toothed oil pump shaft 22 which is connected to on of the planet wheels 7 which is rotatably mounted in the gearing housing 9. The oil pump 21 is connected by a passage 23 to an annular oil cooler 24 which comprises pipes for flow of oil so that the oil undergoes heat exchange with surrounding cooling air 26. From an oil outlet 25 of the oil cooler 24, the lubricating oil passes through a conduit (not shown) to the lubricating points of the reduction gearing 6 and the bearings 3, 8, 16, 33. Collecting pans and lines for the return of the lubricating oil to the oil tank 20 are also not shown.

The stream of cooling air 26 for the oil cooler 24 passes behind the rear propfan stage 11 through an annular cooling air intake channel 27 into an annular space 39 formed between the intake housing 4 of the gas turbine 35 and the gear housing 9 of the reduction gearing 6, and the cooling air flows through the oil cooler 24 in cross-counter flow with the lubricating oil therein to effect heat exchange with the oil flowing in the cooler 24. Then the cooling air flows through an annular discharge channel 40 connected to the annular space 39, such that the cooling air flows along the oil tank 20. The cooling air in space 40 flows through hollow support ribs 29 disposed in the gas turbine intake channel 28 and then into an outer vented chamber 30 between the gas turbine 35 and an engine cowling 31, from which the cooling air is externally discharged to ambient atmosphere at a suitable location through the engine cowling 31 and mixed with bypass air flow flowing around the engine.

Although the invention has been described in relation to a specific preferred embodiment thereof, it will become apparent to those skilled in the art that numerous modifications and variations can be made within the scope and spirit of the invention as defined in the attached claims.

What is claimed is:

1. A propfan turbine engine comprising a gas turbine, a reduction gearing drivingly coupled to said gas turbine and spaced axially thereof, propfan rotor means drivingly connected to the reduction gearing, a lubricating system for said reduction gearing separate from a lubricating system of the gas turbine, said lubricating system for the reduction gearing including a tank for lubricant, a circuit for flow of lubricant between said tank and said reduction gearing, cooling means in said circuit for cooling the lubricant, and pump means for pumping the lubricant in said circuit, said lubricating system for the reduction gearing being in the form of an annular assembly arranged axially between said reduction gearing and said gas turbine, said gas turbine having an intake channel, said cooling means comprising an annular heat exchanger mounted radially inwards of said intake channel.

2. A propfan turbine engine as claimed in claim 1, where said cooling means has an intake channel for cooling air of annular ring-shape arranged in front of the intake channel of the gas turbine relative to the direction of air flow.

3. A propfan turbine engine as claimed in claim 2 wherein said reduction gearing comprises a gear housing, said gas turbine comprises an intake housing, said gear housing and intake housing defining an annular space which is connected to said intake channel of said cooling means, said heat exchanger being disposed in said annular space.

4. A propfan turbine engine as claimed in claim 3 comprising an annular discharge channel connected to and disposed axially behind said annular space for discharge of cooling air from the heat exchanger, a plurality of hollow support ribs in said discharge channel, and an engine cowling surrounding said gas turbine to form an outer space to which said discharge channel is connected.

5. A propfan turbine engine as claimed in claim 3 wherein said tank is mounted in said gear housing.

6. A propfan turbine engine as claimed in claim 5 comprising a drive shaft driven by said turbine and drivingly connected to said reduction gearing, said tank being annular in shape and surrounding said drive shaft.

7. A propfan turbine engine as claimed in claim 6 wherein said reduction gearing comprises a planetary arrangement of a sun gear and a plurality of planet gears mounted in a split gear housing, a pump shaft connected to one of said planet gears and in driving relation to said pump means, said pump shaft being mounted in said gear housing.

8. A propfan turbine engine as claimed in claim 1 comprising a drive shaft drivingly connecting said turbine and said reduction gearing, said annular assembly of said lubricating system surrounding said drive shaft.

9. A propfan turbine engine as claimed in claim 8 wherein said cooling means comprises an annular heat exchanger surrounding said drive shaft.

10. A propfan turbine engine as claimed in claim 9 wherein said heat exchanger includes pipe means for conveying lubricant therein and said cooling means includes an annular channel surrounding said drive shaft for flow of coolant air therein, said pipe means being disposed in said annular channel.

11. A propfan turbine engine as claimed in claim 10 wherein said tank for lubricant is interposed between said drive shaft and said annular channel at a position so that air flowing in said annular channel travels along said tank.

12. A propfan turbine engine as claimed in claim 10 wherein said annular channel has an intake for cooling air, said gas turbine having a channel for flow of cooling air and an intake located axially behind said intake of said annular channel of said cooling means.

13. A propfan turbine engine as claimed in claim 12 wherein said intake of the channel for said gas turbine is located radially outside the intake of said annular channel of said cooling means.

14. A propfan turbine engine as claimed in claim 13 wherein said cooling means further includes a vented chamber with which said annular channel is in communication said vented chamber being disposed downstream of said intake of the channel for said gas turbine.

* * * * *